United States Patent
Wang et al.

(10) Patent No.: US 7,536,908 B2
(45) Date of Patent: May 26, 2009

(54) MICROMACHINED THERMAL MASS FLOW SENSORS AND INSERTION TYPE FLOW METERS AND MANUFACTURE METHODS

(75) Inventors: Gaofeng Wang, San Jose, CA (US); Chih-Chang Chen, Cupertino, CA (US); Yahong Yao, Palo Alto, CA (US); Liji Huang, San Jose, CA (US)

(73) Assignee: Siargo, Ltd., San Jose, CA (US)

( * ) Notice: Subject to any disclaimer, the term of this patent is extended or adjusted under 35 U.S.C. 154(b) by 0 days.

(21) Appl. No.: 11/157,604

(22) Filed: Jun. 21, 2005

(65) Prior Publication Data

US 2007/0017285 A1    Jan. 25, 2007

Related U.S. Application Data

(63) Continuation-in-part of application No. 10/799,071, filed on Mar. 11, 2004.

(51) Int. Cl.
*G01F 1/68* (2006.01)
(52) U.S. Cl. .................... 73/204.26; 73/204.15
(58) Field of Classification Search .................. None
See application file for complete search history.

(56) References Cited

U.S. PATENT DOCUMENTS

| | | | | |
|---|---|---|---|---|
| 4,537,068 A | * | 8/1985 | Wrobel et al. ............ | 73/861.02 |
| 5,237,867 A | * | 8/1993 | Cook, Jr. .................. | 73/204.15 |
| 5,393,351 A | * | 2/1995 | Kinard et al. .............. | 136/225 |
| 6,047,597 A | * | 4/2000 | Kleinhans ................. | 73/204.15 |
| 6,684,694 B2 | * | 2/2004 | Fujiwara et al. .......... | 73/204.26 |
| 6,752,014 B1 | * | 6/2004 | Kanke et al. .............. | 73/204.15 |
| 6,840,102 B2 | * | 1/2005 | Kouno ...................... | 73/204.15 |
| 2004/0211253 A1 | * | 10/2004 | Horie et al. .............. | 73/204.15 |

* cited by examiner

*Primary Examiner*—Harshad Patel
(74) *Attorney, Agent, or Firm*—Bo-In Lin

(57) ABSTRACT

An integrated mass flow sensor is manufactured by a process of carrying out a micro-machining process on an N or P-type silicon substrate with orientation <100>. This mass flow sensor comprises a central thin-film heater and a pair of thin-film heat sensing elements, and a thermally isolated membrane for supporting the heater and the sensors out of contact with the substrate base. The mass flow sensor is arranged for integration on a same silicon substrate to form a one-dimensional or two-dimensional array in order to expand the dynamic measurement range. For each sensor, the thermally isolated membrane is formed by a process that includes a step of first depositing dielectric thin-film layers over the substrate and then performing a backside etching process on a bulk silicon with TMAH or KOH or carrying out a dry plasma etch until the bottom dielectric thin-film layer is exposed. Before backside etching the bulk silicon, rectangular openings are formed on the dielectric thin-film layers by applying a plasma etching to separate the area of heater and sensing elements from the rest of the membrane. This mass flow sensor is operated with two sets of circuits, a first circuit for measuring a flow rate in a first range of flow rates and a second circuit for measuring a flow rate in a second range of flow rates, to significantly increase range of flow rate measurements, while maintains a high degree of measurement accuracy.

34 Claims, 10 Drawing Sheets

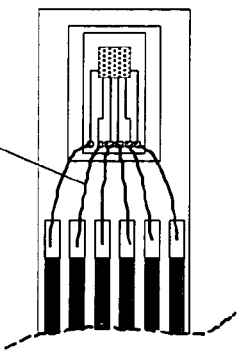
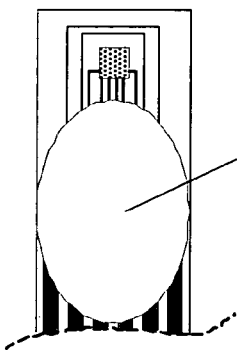
FIG. 15A  FIG. 15B
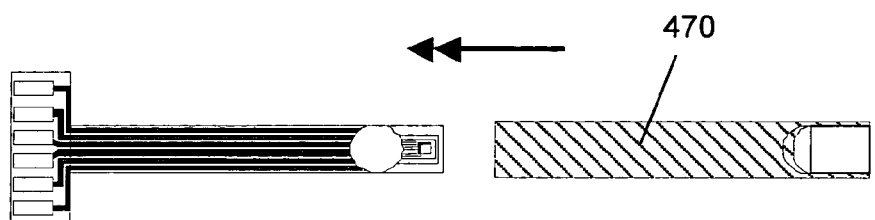
FIG. 16A
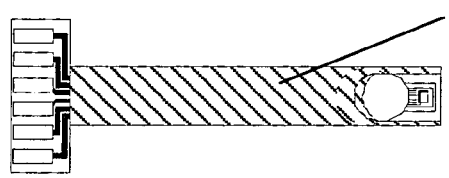
FIG. 16B

MICROMACHINED THERMAL MASS FLOW SENSORS AND INSERTION TYPE FLOW METERS AND MANUFACTURE METHODS

This patent application is a Continuous in Part Application (CIP) and claims the Priority Date of a co-pending patent application Ser. No. 10/799,071 filed on Mar. 11, 2004 by one of the co-inventors of this application.

BACKGROUND OF THE INVENTION

1. Field of the Invention

The present invention is generally related to mass flow sensors, and more particularly relates to high-performance mass flow sensors made of micro-electro-mechanical systems (MEMS) approach and the methods of making and operating such high-performance mass flow sensors.

2. Description of the Related Art

Conventional technologies of mass flow sensors are still limited by the difficulties of limited ranges of flow rate measurement, low accuracy and the requirement to maintain a high level of heating power. Specifically, the commercially available thermal mass flow sensors are commonly made of transducers that include heaters and temperature sensors. The heater and temperature sensors are commonly provided with resistance wires such as platinum wires on a ceramic substrate. The stream of flow when passing over the mass flow sensor, carries away the heat from the heater thus causes temperature variations. The temperature variations and distributions depend on the mass flow rate, e.g., the velocity and the material properties of the flow. Thus the temperature of the heater and temperature distributions as that measured by the temperature sensors around the heaters can therefore be applied to measure and calculate the mass flow rate.

Heat transfer principle has been widely used for mass flow measurements. Thermal mass flow sensors can be found in many applications from process monitoring, industrial measurements, to medical delivering. In particular, MEMS technology allows fabrication of thermal mass flow sensors directly on silicon with small size, low power, and high reliability at low cost. MEMS-based thermal mass flow sensors have been becoming popular in flow measurement applications. Especially, over the past few years, the advancements made in the technologies of micro-electromechanical system (MEMS) have enabled the fabrication of mass flow sensors directly on silicon. The small size of the MEMS sensor enables new applications of the thermal mass flow rate sensors where size is a key factor. However, as further discussed below, the limited ranges of flow rate measurements and the technical difficulties in improving the measurement accuracy are still the hindrances to broadly apply a MEMS flow sensor in different applications.

Thermal mass flow sensors can be classified into three basic categories: anemometers, calorimetric flow sensors, and time-of-flight sensors. For simplicity, these three types of thermal mass flow sensors are hereinafter abbreviated as A-type, C-type, and T-type mass flow sensors, respectively. Hariadi et al (I. Hariadi, H.-K. Trieu, W. Mokwa, H. Vogt, "Integrated Flow Sensor with Monocrystalline Silicon Membrane Operating in Thermal Time-of-Flight Mode," The 16th European Conference on Solid-State Transducers, Sep. 15-18, 2002, Prague, Czech Republic) disclose a time-of-flight flow sensor fabricated on Silicon-On-Insulator (SOI) wafers, in which heat pulse is fed to the fluid by a heater and a temperature sensor located downstream detects its delay. Measuring a flight time, the sensors give the velocity of the streaming fluid. However, the pulse will be deformed by the flow velocity profile and broaden at the same time by heat diffusion when it propagates down the stream. This means that the pulse tends to be too broad to be useful for slow flows and thus become inaccurate.

Jiang et al (F. Jiang, Y. C. Tai, C. M. Ho, and W. J. Li, "A Micromachined Polysilicon Hot-Wire Anemometer," Digest Solid-State Sensors & Actuator Workshop, Hilton Head, S.C., pp. 264-267, 1994) disclose a micro-machined A-type flow sensor comprising of a single element, which is heated and the heat loss of which is measured. This heat loss is dependent on the flow rate of the fluid. This heat loss increases with the flow velocity, and the signal of an anemometer is proportional to the square root of the flow velocity. In general, A-type mass flow sensors are less sensitive in small flows and hence cannot measure small flows accurately. Nevertheless, A-type mass flow sensors have demonstrated that they are capable of accurately measuring flows with high velocities.

Calorimetric flow sensors usually consist of a heater surrounded by temperature sensitive elements arranged symmetrically downstream and upstream. A moving fluid will carry away heat in the direction of flow and accordingly change the temperature distribution around the heater. The temperature difference between upstream and downstream is measured by the temperature sensitive elements. The output signal is commonly fetched using a Wheatstone bridge circuit, in which a pair of downstream and upstream sensing elements comprises two of its four branches. The output signal, which is a measure of temperature difference, is proportional to the flow velocity initially until a high flow velocity is reached where the temperature difference saturates and then decreases at higher flow velocity. In general, calorimetric flow sensors can accurately measure flows with extremely low velocities. However, calorimetric flow sensors may saturate at high flow velocities and hence have a difficulty to measure flows above a certain level of flow velocity.

In summary, there are primary physical limitations for A-type mass flow sensors to extend their measurable flow rate ranges to lower flow velocities. On the other hand, the C-type mass flow sensors is able to extend the measurable flow rate ranges to lower flow velocities but the C-type mass flow sensors become saturated and inaccurate when the flow velocity reaches a higher velocity. Hence, a major concern for mass flow sensors is how to increase their measurable flow rate ranges.

U.S. Pat. No. 4,501,144 describes a calorimetric flow sensor, which was designed to measure either average gas velocity or mass flow rate through a flow channel. This mass flow sensor consisted of two thermally isolated silicon nitride membranes with a central heating, serpentine-resistor-element grid divided equally between the two bridges (or cantilevers). In addition, two identical thin-film serpentine resistor grids with relatively large temperature coefficients of resistance (TCRs) served as temperature sensors, placed symmetrically with respect to the heater on each microbridge. The sensor and heater grids were made of diffused or (temperature-sensitive) thin-film platinum or permalloy (Ni80Fe20), and were encapsulated in a 0.8~1.0 micron thick dielectric silicon nitride film, which comprised the suspended microbridges. Anisotropic etching of the silicon substrate (with KOH plus isopropyl alcohol) was used to create an air space pit below the microbridges that was preferably ~125 micron deep, precisely bounded on the sides by (111) silicon planes, and on the pit bottom and ends of the bridges by the (100) and other planes. The symmetry and effectiveness of the microbridge that is etched undercut was maximized by orienting the longitudinal axis of each bridge at an angle of 45° with respect to the <110> direction in the mono-crystalline silicon substrate.

In a U.S. Pat. No. 6,550,324, Mayer et al. disclosed a mass flow sensor. As that shown in FIG. 1B, the flow sensor includes a heating element (4) arranged between two temperature sensors in order to measure the mass flow of a liquid or a gas. The mass flow is determined from the temperature difference of the temperature sensors (5, 6). For the pulse of reducing power consumptions, electric pulses are provided to operate the heating element (4). A further reduction of the power consumption is reached by means of a monitoring circuit (12), which switches the actual measuring section (11) on only if the signals from the temperature sensors (5, 6) fulfill a threshold condition. The pulsed power techniques as discussed above still face the difficulties that the range of measurements and accuracy are limited.

However, the above-mentioned techniques as discussed do not provide a resolution to the major concerns for mass flow sensors. Specifically, for those of ordinary skill in the art there is still a need to provide a mass flow sensor to expand the ranges of flow rate with sufficient accuracy.

SUMMARY OF THE INVENTION

According it is an object of the present invention to provide a MEMS mass flow sensor and MEMS flow sensor array with significantly increased range of flow rate measurements, while maintains a high degree of measurement accuracy such that the above-discussed difficulties can be resolved.

Another aspect of the invention is to provide an improved method for manufacturing the flow sensor and also for operating the high performance mass flow sensors disclosed in this invention.

According to the present invention, the mass flow sensor includes a MEMS chip. The MEMS chip includes four elements and these four elements are a heater, an ambient temperature-sensing element or as often referred to as a reference resistor, an upstream sensing element, and a downstream sensing element. All of these elements are made of thermo-sensitive resistive materials, i.e., their resistances change with their respective temperatures. In general, each of the heater and the upstream and downstream sensing elements is located within a flow path and substantially isolated thermally from all other parts for preventing thermal conductions. The ambient temperature-sensing element generally is disposed on the MEMS chip substrate in order to keep its temperature ambient. All of these four elements are electrically connected in such a way that both A-type and C-Type mass flow sensing and measurements can be implemented simultaneously.

According to the present invention, two Wheatstone bridge circuits are implemented to obtain both the A-type and C-type mass flow sensing signals. The heater and the ambient temperature-sensing element make up two branches of a first Wheatstone bridge circuit, while the upstream and downstream sensing elements make up two branches of a second Wheatstone bridge circuit. The first Wheatstone bridge circuit is utilized to serve two purposes: (1) providing A-Type mass flow sensing signal; (2) achieving constant-temperature control to the heater. The second Wheatstone bridge circuit serves only one purpose and that is to provide the C-Type mass flow sensing signal.

In accordance with the present invention, both the A-type and C-type mass flow-sensing signals are amplified and conditioned by either a multiple-channel electrical signal-conditioning circuit or two separate electrical signal-conditioning circuits into electrical analog signals. The two amplified analog signals outputted from the signal conditioning circuit(s) are then sampled into two digital signals by a multiple-channel analog-to-digital device or two single-channel analog-to-digital devices. These two digital signals are then imported into a digital processing unit, e.g., a micro-controller, for further processing.

In accordance with the present invention, the two digital signals obtained from the A-type and C-type sensing signals via signal-conditioning and analog-to-digital conversions are processed by a digital processing unit and combined within this digital processing unit to provide a single measurement signal for the mass flow. Algorithms to generate such a single measurement signal from the A-type and C-type digital signals are implemented either as a firmware or hardware within the digital processing unit.

In accordance with the present invention, both the A-type and C-type mass flow sensing signals can also be combined, alternatively, by an analog hardware system to give a single measurement signal. Such analog hardware may include capabilities of signal-conditioning and amplification functions and multiplexing of multiple analog signals.

In a preferred embodiment, the mass flow sensor includes a first set of temperature sensors connected to a first circuit for measuring a temperature difference between an upstream and a downstream temperature sensing elements for measuring a flow rate in a first range of flow rates. The mass flow sensor further includes a second set of temperature sensors connected to a second circuit for measuring a heat loss of a heating element with reference to an ambient temperature for measuring a flow rate in a second range of flow rates. In a preferred embodiment, the first circuit and the second circuit comprising respectively a first Wheatstone bridge circuit and second Wheatstone bridge circuit. In another preferred embodiment, the first set of temperature sensors and the second set of sensors are disposed on a thermally isolated membrane extending over a bulk-etched cavity in a substrate. In another preferred embodiment, the thermally isolated membrane is disposed on a top surface of the substrate and the bulk-etched cavity is a cavity opened by a bulk etching from a bottom surface opposite the top surface. In another preferred embodiment, the thermally isolated membrane is disposed on a top surface of the substrate and the bulk-etched cavity is a cavity opened by a bulk etching from a bottom surface opposite the top surface along a <100> crystal plane. In another preferred embodiment, the thermally isolated membrane is disposed on a top surface of the substrate and the bulk-etched cavity is a cavity opened by a TMAH bulk etching from a bottom surface opposite the top surface. In another preferred embodiment, the thermally isolated membrane is disposed on a top surface of the substrate and the bulk-etched cavity is a cavity opened by a KOH bulk etching from a bottom surface opposite the top surface. In another preferred embodiment, the thermally isolated membrane is disposed on a top surface of the substrate and the bulk-etched cavity is a cavity opened by a plasma bulk etching from a bottom surface opposite the top surface. In another preferred embodiment, the first and second sets of temperature sensors further comprising a Pt/Cr resistor.

These and other objects, features and advantages of the present invention will no doubt become apparent to those skilled in the art after reading the following detailed description of the preferred embodiments that are illustrated in the several accompanying drawings.

BRIEF DESCRIPTIONS OF THE DRAWINGS

The present invention can be better understood with reference to the following drawings. The components within the drawings are not necessarily to scale relative to each other, emphasis instead being placed upon clearly illustrating the principles of the present invention.

FIGS. 15A to 15B are cross sectional views for showing the wire bonding processes for connecting the sensor chip to the connecting wires on the substrate carrier.

FIGS. 16A and 16b are cross sectional view for showing encapsulating the sensor assembly into an encapsulation and flow condition tube.

DETAILED DESCRIPTION OF THE PREFERRED EMBODIMENTS

Figure 1:
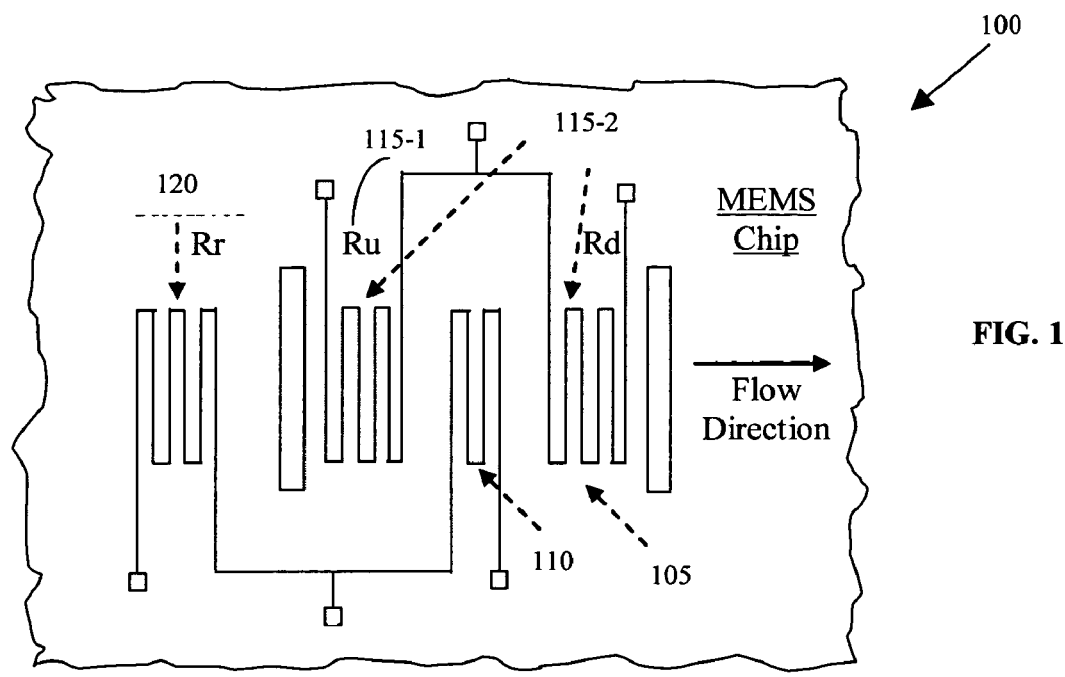
FIG. 1 is a top view illustration of a MEMS sensor chip of this invention

FIG. 1 shows a top view of a flow rate sensor 100 as a preferred embodiment of the present sensor. The flow rate sensor 100 is supported on a membrane 105 and is manufactured by applying the MEMS manufacturing processes as illustrated below. The flow rate sensor includes a heater 110 and temperature sensing resistors 115-1 and 115-2 disposed on the upstream and downstream respectively of the heater 110. The heater 110 is a thin-film heating element and the temperature sensing resistors 115-1 and 115-2 is a pair of thin-film sensing resistors on a thin thermally isolated membrane 105 disposed over a micro-machined silicon substrate. The upstream and downstream sensing resistors 115-1 and 115-2 respectively may be symmetrical, i.e., resistors of equal resistance, or non-symmetrical resistors, i.e., resistors of different resistances. The upstream and downstream sensing resistors may be arranged to locate at either a symmetrical or non-symmetrical locations. The flow rate sensor further includes a reference resistor 120, a thin-film ambient temperature-sensing element.

In the operation of the flow sensor, the heater element 110 is energized to produce a temperature elevation at the center that is considerably higher than the ambient temperature. A temperature gradient thus is produced from the center heater to edges of the membrane area. The sensing resistors 115-1 and 115-2 preferably made of materials, exhibiting a high resistance dependence on temperature, preferably a high thermal coefficient resistance (TCR) (e.g., 3000 ppm/° C.~8300 ppm/° C.). Accordingly, the resistances of the sensing resistors are caused to change in proportional to the temperature change in the area of the membrane containing the sensing resistors. The heater 110 and reference resistor 120 preferably made of similar materials like the sensing resistors, exhibiting a high resistance dependence on temperature, preferably a high TCR. The reference resistor is located on the silicon substrate and thus its resistance changes with the ambient temperature.

Figure 2:
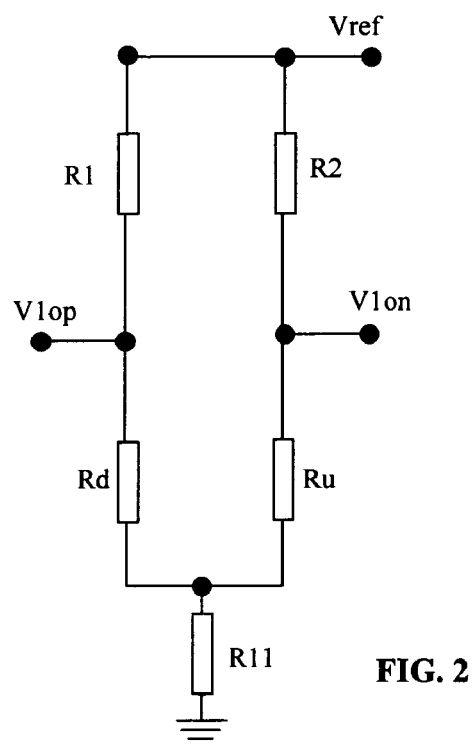
FIG. 2 is a circuitry illustration of a preferred C-type sensing bridge circuit

As the flow moves along the direction from the upstream toward the downstream, it carries away heat in the direction of flow and accordingly changes the temperature distribution around the heater. The temperature difference between upstream and downstream temperature sensing resistors can be measured by applying the sensing resistors 115-1 and 115-2. That is the principle of C-type flow sensing. FIG. 2 shows a Wheatstone bridge circuit implemented in a C-type flow sensing. The Wheatstone bridge circuit a first branch that includes a resistor R1 and the downstream resistor Rd. The Wheatstone bridge circuit further includes a second branch that includes a resistor R2 and the upstream resistor Ru. A voltage difference V1o is measured at the midpoints, i.e., V1o=(V1op−V1on). This voltage difference V1o represents a C-type sensing signal corresponding to the mass flow rate that causes the change of resistances in Rd, i.e., resistor 115-2, and Ru, i.e., resistor 115-1, due to temperature difference and thus generates the voltage difference. The voltage difference is proportional to the flow rate when the flow rate is below certain measurement saturation value. The voltage difference decreases when the flow speed is higher than the saturation value and the temperature difference as that represent by the voltage difference V1o is no longer useful for mass flow measurement. The resistors R1, R2, and R11 can be implemented as part of thin film resistor formed on the membrane 105. The resistors R1, R2, and R11 can also implemented as externally connected resistors for connection to Rd and Ru to form the Wheatstone bridge. According to FIG. 1, the resistors R1, R2, and R11 are implemented as externally connected resistors to the resistors 115-1 and 115-2 to form the Wheatstone bridge circuit shown in FIG. 2.

The C-type flow sensing implemented with the two-branch Wheatstone circuit as shown in FIG. 2 uses a differential configuration and thus has strong rejection to environment noise due to common-mode noise cancellation between downstream and upstream. Therefore, the C-type sensing gives good accuracy to measurement of extremely small flows, which is hardly to be measurable by other measurement mechanisms due to extremely high noise-to-signal ratio during small flow measurements. In general, the C-type sensing can achieve a rather broad range of flow measurements, e.g., 50:1~100:1, from a very small mass flow to the medium flow rates.

As mentioned above, the temperature difference between upstream and downstream saturates once a flow reaches a certain velocity level hereinafter this velocity is referred to as the saturation velocity level. When the flow velocity is greater than the saturation speed, the temperature difference is decreased with the increase of the flow rate. Thus, the C-type flow sensing is not applicable for a flow larger than the saturation velocity level. In accordance with the present invention, the A-type flow sensing will be employed for high flows beyond the saturation velocity level.

Figure 3:
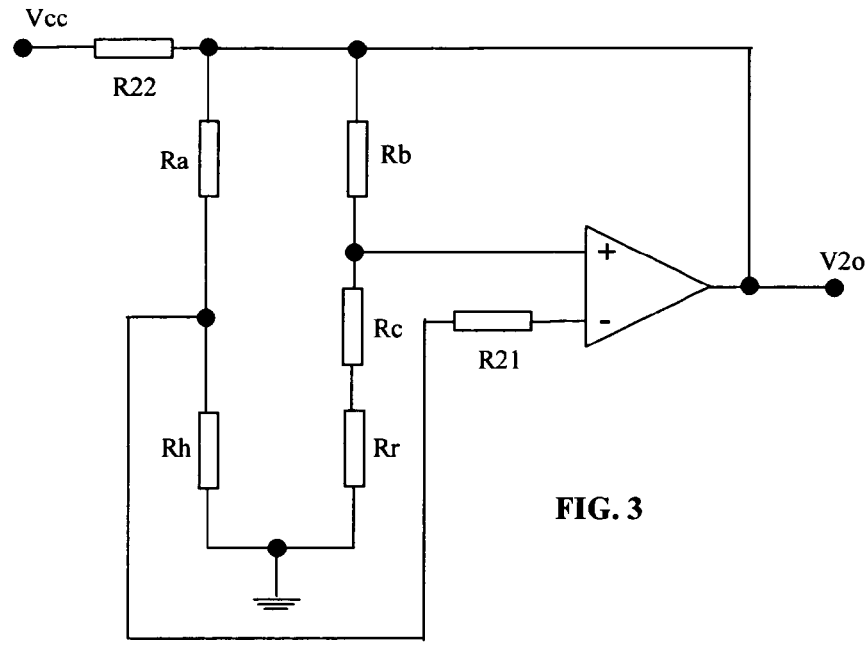
FIG. 3 is a circuitry illustration of a preferred A-type sensing bridge circuit

FIG. 3 shows an improved Wheatstone bridge circuit implemented in a preferred embodiment of this invention. The Wheatstone bridge circuit includes two branches. A first branch includes the heater resistor Rh connected to a resistor Ra. A second branch includes the reference resistor Rr connected to two resistors Rc and Rb. The reference resistor Rr is formed on a silicon substrate and is applied to monitor the ambient temperature. The heater temperature Rh usually has a much higher temperature than the ambient temperature such as 200° C. to satisfy the bridge circuit balance requirement. The output voltage V2$o$ is a measure of heat loss from the heater that is proportional to the flow velocity. Therefore, the voltage V2$o$ represents an A-type sensing signal. The flow sensing as shown in FIG. 3 is most suitable for high velocity flow to provide accurate mass flow rate measurement. Usually, the range of flow velocity measurement of this A-type measurement is ranging from nine times to twenty times the flow velocity as that measured by the C-type flow sensors described above. By applying a Wheatstone bridge as that shown in FIG. 3, this type of sensor is also implemented as a constant temperature controlling circuit for controlling the heater Rh. The temperature of the heater above the ambient temperature is dependent on the resistor Rc and the ratio of the Rb/Ra. With predetermined values of these resistors, the heater temperature above the ambient temperature can be determined. The resistors Rh as the heater and the reference resistor Rr are formed as thin film resistor on the membrane as shown in FIG. 1. The resistors Ra, Rb, Rc, and R21 can also be formed as thin film resistor on the membrane 105 or alternately implemented as externally connected resistors. In the preferred embodiment as shown in FIG. 1, Ra, Rb, Rc, and R21 are implemented as externally connected resistors.

Figure 4:
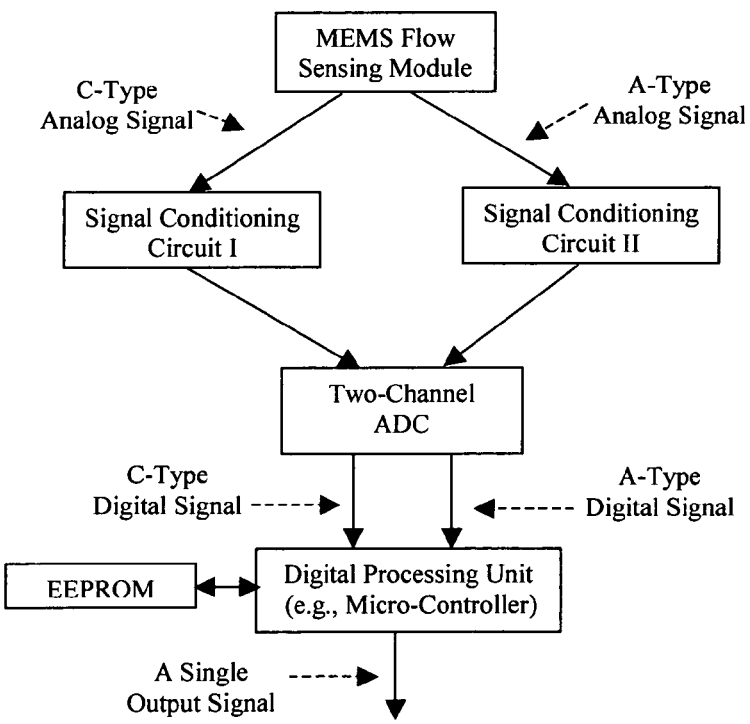
FIG. 4 is a circuit illustration of a preferred combined A-type and C-type control circuits.

FIG. 4 is a functional block diagram to illustrate a two-channel implementation of a flow-sensing device of this invention. From a flow-sensing module 100 as that shown in FIG. 1, with two types of Wheatstone circuits shown in FIGS. 2 and 3, two types of flow sensing signals are generated. As described above, the flow measurement signals generated from the two types of Wheatstone circuits are amplified and processed as conditioned analog signals by two separate electrical signal process circuits. The signal processing circuit carries out conditioning of the measurement signals including filtering of signal noises and amplifying the flow rate measurement signals. There are standard signal processing circuits commercially available for implementation of the flow rate sensors. The two amplified and processed analog signals are then sampled into two digital signals by a two-channel analog-to-digital device. These two digital signals are then imported into a digital processing unit, e.g., a micro-controller, for further processing.

The present invention describes an improved MEMS mass flow sensor, which is capable of simultaneously combining both A-type and C-Type operations to achieve significantly expanded measurable flow rate range, e.g., the ratio of the detectable maximum to minimum flow rates could achieve 1000:1. In addition, the present invention disclosed methods of operating such high-performance mass flow sensors.

In preferred embodiments of the present sensor, the two digital signals obtained from the A-type and C-type sensing signals via amplification, signal processing, and analog-to-digital conversions are processed by a digital processing unit and combined within this digital processing unit to provide a single measurement signal for the mass flow. Algorithms to generate such a single measurement signal from the A-type and C-type digital signals are implemented either as a firmware or hardware within the digital processing unit.

In preferred embodiments of the present sensor, the digital processing unit monitors both the A-type and C-type signals. The digital processing unit will, a priori, detect and record the saturation point of the C-type signal, and is able to automatically switch between the A-type signal and the C-type signal as well as seamlessly combine the A-type and C-type signals into a single measurement signal. As a consequence, the digital processing unit will use the C-type digital signal for measurement of extremely small to medium flows, whereas employ the A-type digital signal for measurement of large flows.

According to FIG. 4, these two sets of signals are first recorded simultaneously during a calibration process and then in actual flow measurements. The signals obtained in the calibration process are initially recorded in a database table to correlate the mass flow rate to the signals measured and transmitted from both the C-type and A-type Wheatstone circuits. According to this database table, a program executed by the digital processing unit determines a maximum flow rate measurable by a C-type sensor corresponding to a signal obtained from the C-type Wheatstone circuit as that shown in FIG. 2. When the signal received from this C-type Wheatstone Bridge circuit exceeds the maximum flow rate measurable by the C-type flow sensor, the signals obtained from the A-type Wheatstone Bridge circuit are employed to measure the flow rate. The digital signal processing unit are provided with different flow-rate computational programs to compute the flow rates by using the digital signals measured by the flow sensors and transmitted and processed from both the C-type and A-type Wheatstone Bridge circuits. The flow-rate versus C-type and A-type signal calibration data table obtained in a calibration process is also available as a database table for the flow rate computations when these flow rate programs are executed.

The processing steps for manufacturing the MEMS flow sensor on a semiconductor substrate are described below. In a preferred embodiment, a micro-machining process is carried out on an N or P-type silicon substrate to produce the mass flow sensor. It is preferable to carry out the micro-machining process on the substrate along an <100>-crystal orientation. The <100>-crystal orientation is a preferable orientation when applying a KOH or TMAH wet etch process. It is well understood that the etch process rate along different directions is a competition between <100> and <111> crystal planes. For a KOH or TMAH wet etch process, the etch rate along the <100> crystal plane is much faster than that for <111> that results a more effective operation when the etch process is applied for producing a backside opening as will be further described below. This mass flow sensor comprises a central thin-film heater and a pair (or plural pairs) of thin-film heat sensing elements, and a thermally isolated membrane supporting the heater and the sensors out of contact with the substrate base.

Figure 5:
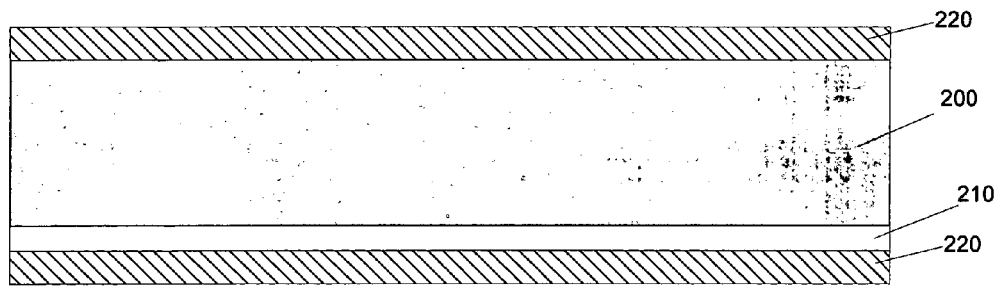
FIG. 5 is a cross sectional view of the silicon wafer with thermal oxide on backside and low stress silicon nitride film on both sides with patterned sensing elements, heater, reference resistor and offset resistor.
Figure 6:
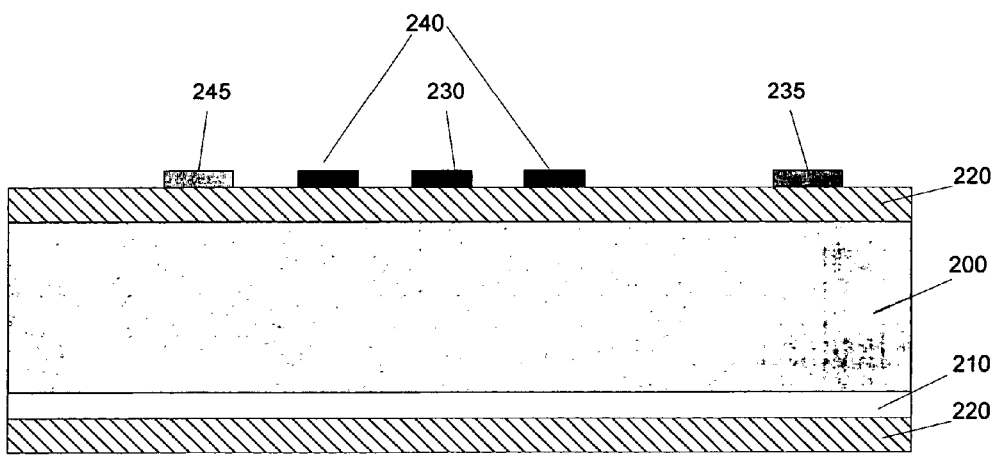
FIG. 6 is a side cross sectional view for showing the application of a second mask to deposit and form the leads and device pads.
Figure 7:
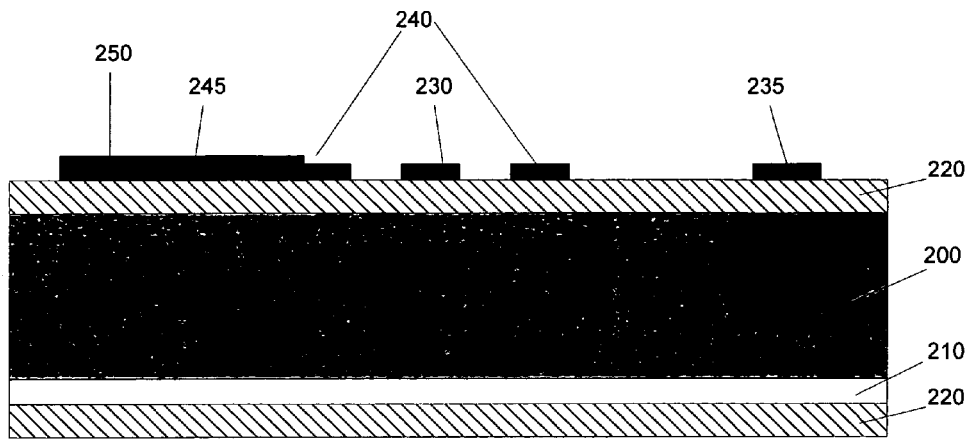
FIG. 7 is side cross sectional view for showing the formation of passivation layer.
Figure 8:
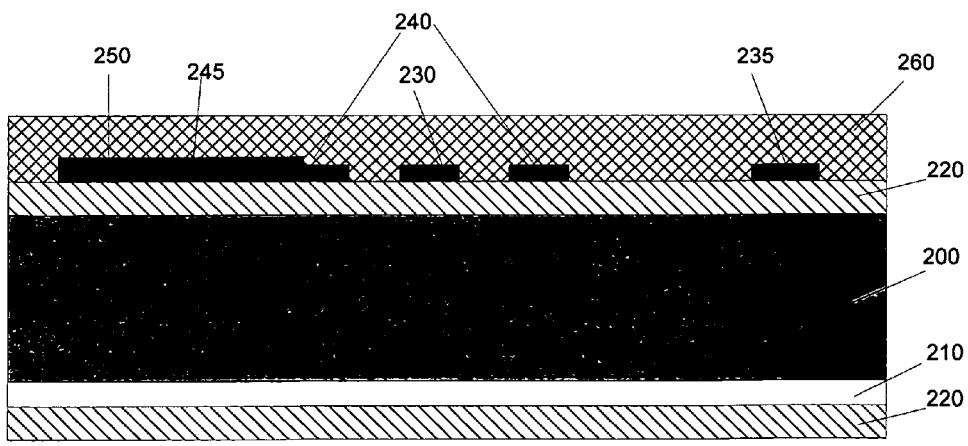
FIG. 8 is side cross sectional view for showing the application of a third mask to open the contact and thermal isolation openings.
Figure 9:
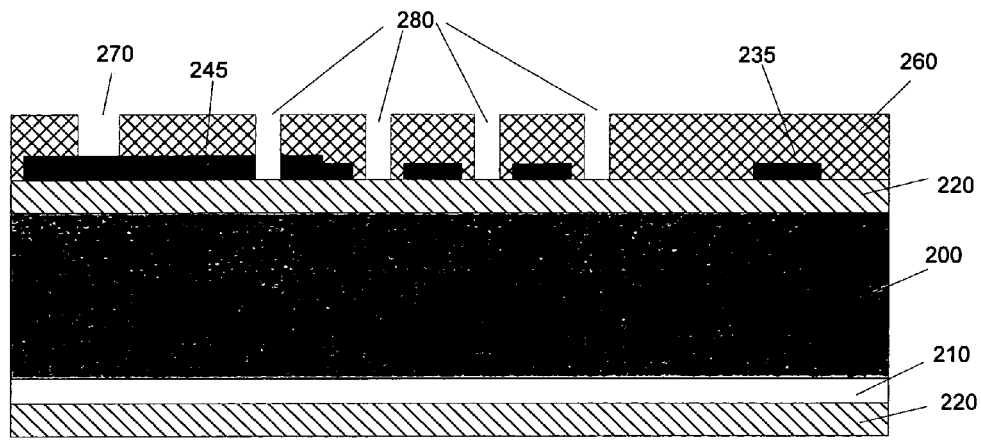
FIG. 9 is side cross sectional view for showing the formation of a thermal oxide layer and a silicon nitride layer as a etch stop layer.
Figure 10:
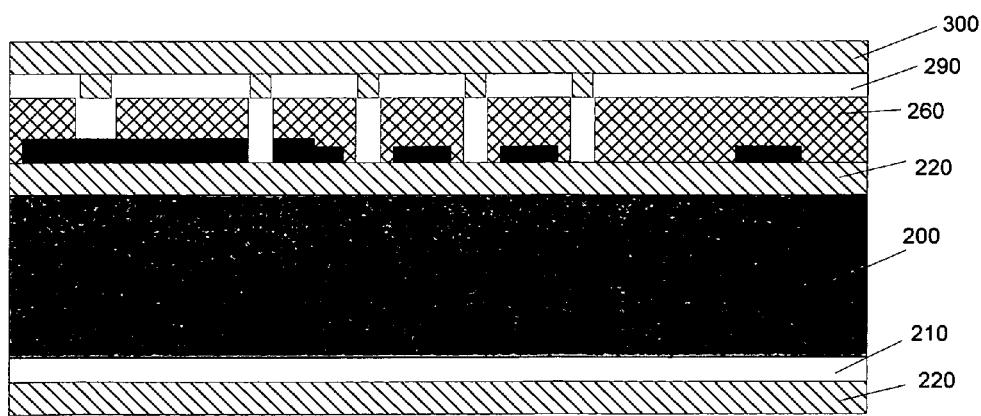
FIG. 10 is side cross sectional view for showing the patterning of a backside to open an etch window.

FIG. 5 shows a side cross sectional view of s silicon substrate. The substrate 200 can be either a N-type or P-type substrate. The process starts with the substrate 200 by forming a thermal oxide layer 210 with a thickness of about 1000 to 5000 Å on a backside then forming a nitride layer 220 with a thickness of about 3000 to 10000 Å on both sides of the substrate 200. As illustrated in FIG. 6, a first mask is applied to deposit and pattern the Cr/Pt micro-heater 230 and sensors 240 with a thickness of Cr about 50 to 500 Å and Pt from 800 to 3000 Å. Further deposited are Cr/Pt offset resistor 235 and reference sensor 245 with a thickness of Cr about 50 to 500 Å and Pt from 800 to 3000 Å. FIG. 7 shows the application of a second mask to deposit and form the leads having a thickness ranging from 50 to 500 Å and Cr/Au device pads 250 having a thickness ranging from about 800 to 3000 Å. In FIG. 8, a passivation layer is formed by depositing a silicon nitride layer 260 having a thickness about 2000 to 5000 Å, and as shown in FIG. 9 a third mask is applied to open the contact 270 and heat insulation 280. Such opening will also serve as the isolation and boundary layer for the flow field so that the there will be no abrupt thermal filed in the measurement region of the sensors. In FIG. 10, a thermal oxide layer 290 with a thickness of about 2000 to 8000 Å is formed covering the top surface. A silicon nitride layer 300 having a thickness about 1000 to 8000 Å or a low temperature thermal oxide layer 300 having a thickness about 2000 to 10000 Å is formed on top of the silicon oxide layer 290 by applying a chemical vapor deposition as etch-stop protection layers for a silicon bulk etching. The backside silicon nitride layer 220 is then removed via plasma etch. The silicon bulk etching process by using TMAH of KOH or plasma etching to etch off the bulk silicon through an opening on the thermal oxide layer 210 as will be further described below.

Figure 11:
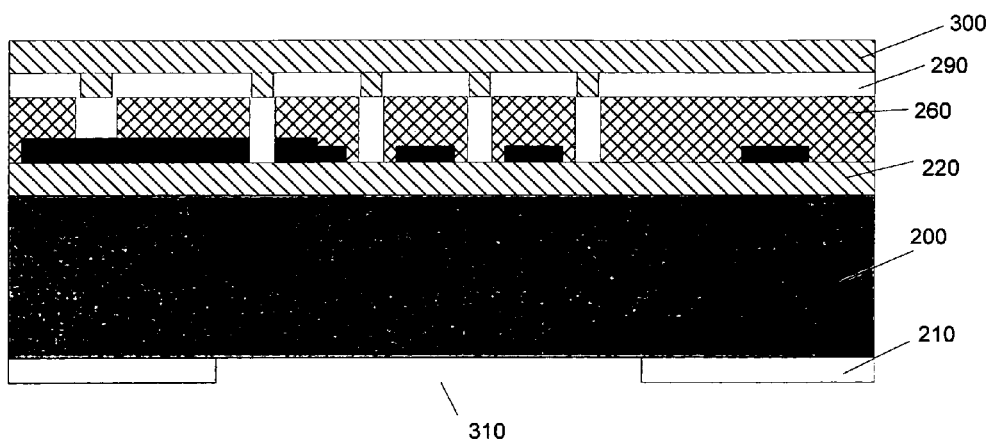
FIG. 11 is side cross sectional view for showing the application of a bulk etching by TMAH, KOH or plasma etch from the backside to form a cavity underneath the membrane.
Figure 12:
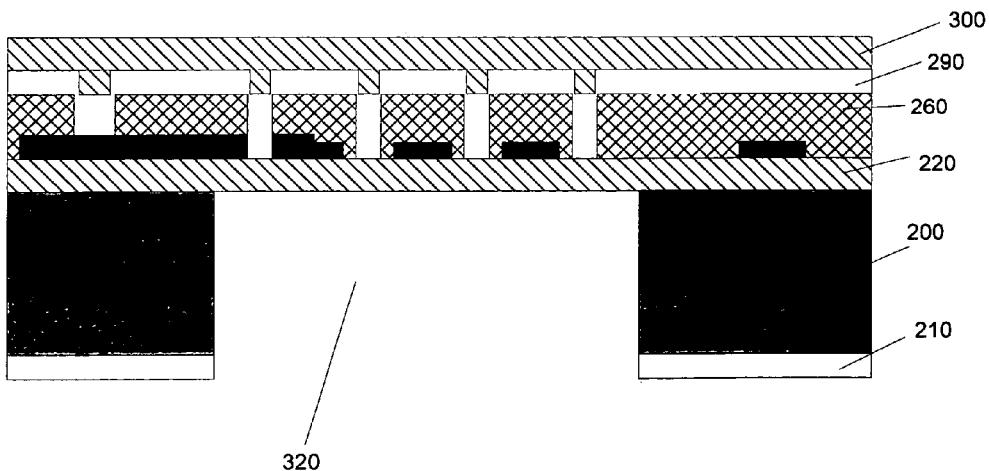
FIG. 12 is side cross sectional view for showing the removal of the thermal oxide and the silicon nitride layer to complete the processes for making the flow rate sensor.
Figure 13:
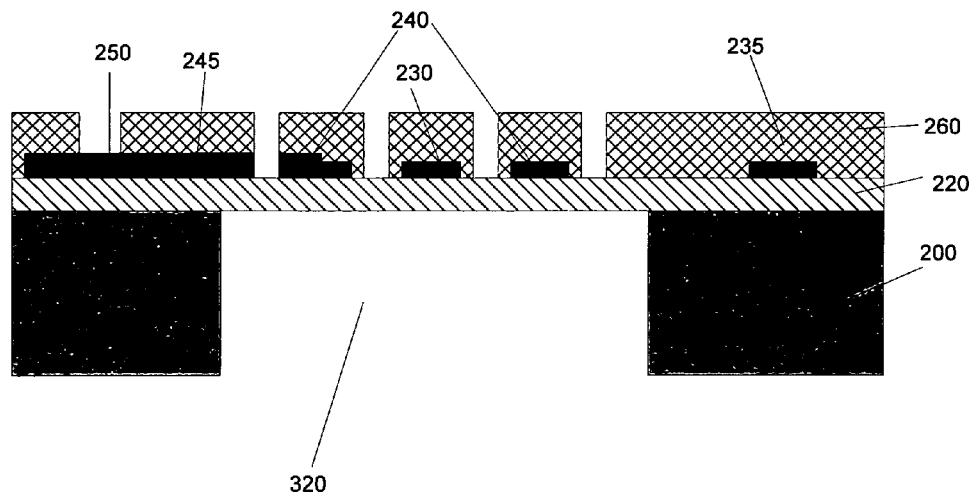
FIG. 13 is a cross side cross sectional view of a MEMS flow sensor after the removal of the etch stop layer and the oxide layers from the top and bottom surfaces to complete the MEMS sensor processes.

In FIG. 11, a fourth mask is used to pattern the backside of the thermal oxide layer 210 to open an etch window 310 using wet chemical etch such as hydrofluoric acid etch to apply a KOH or TMAH or plasma etch through this etch window 310. A bulk wet-etch by applying KOH or TMAH or plasma etching process is shown in FIG. 12. The etch process removes the bulk silicon substrate and open a cavity 320 in the substrate 200. In FIG. 13, the etch-stop protection layer 300 on the top is etched and removed by applying a reactive-ion etch. Then the bottom oxide layer 210 and the top oxide layer 290 are removed by etching oxide on both sides in Hydrofluoric (HF) contained acids or PAD etchant to produce the MEMS sensor supported on a membrane, i.e., the insulation layer 220, as shown in FIG. 1.

Figures 14A, 14B, 14C, 14D:
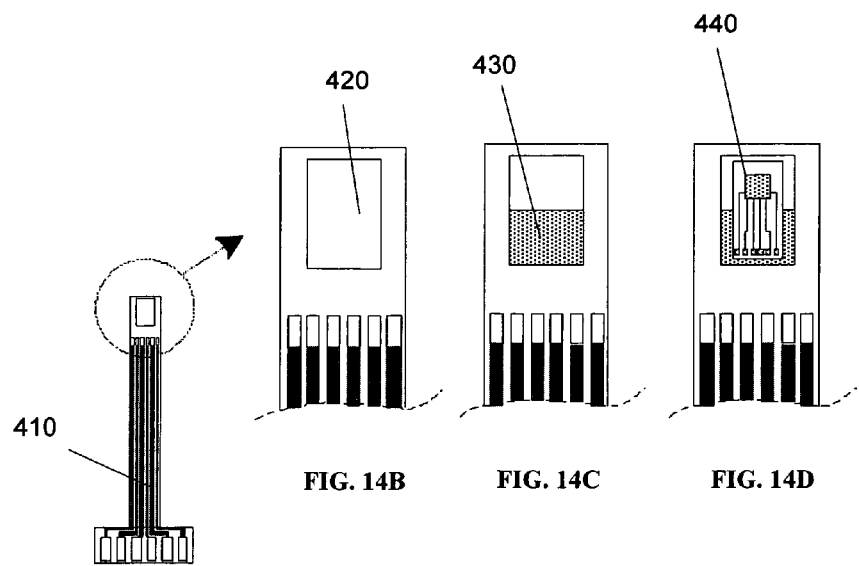
FIGS. 14A to 14D are side cross sectional view for showing the processes to attach the MEMS sensor chip to the substrate carrier.

After the MEMS flow sensor is manufactured as described above, the flow sensor is then assembled into a flow meter according to the processes described below. In FIG. 14A, the sensor is preferably attached to a carrier substrate 410 composed of ceramics such as silicon nitride. The carrier substrate 410 may also be a printed circuit board (PCB) with surface corrosion passivation or protection. As shown in FIG. 14B, a heat sink 420 is disposed at the top of the carrier substrate 410. The heat sink 420 is made of metals or diamond with top surface coated with gold or platinum if the sink is made of metals. The assembling processes followed by dispensing two cartridges of epoxy materials or any thermally conductive adhesives in an even ratio into an applicator prepared by user, and then mix them carefully before application. As that shown in FIG. 14C, the adhesive is applied to the bottom portion of the heat sink on the assembly to form a thin film 430. In FIG. 14D, the MEMS sensor chip 440 is attached on top of heat sink 420.

In FIG. 15A, applying a wire bonder, e.g., an ultrasonic wire bonder, to form the gold or aluminum wires 450 to connect the MEMS sensor chip 440 to the assembly. In FIG. 15B, after the formation of the bonding wires 450, a silicon gel 460, e.g. RTV silicon sealant, is dispensed on top of the wires and the bonding pad. After the silicon sealant is completely dry out, FIG. 16A shows a process of encapsulating the sensor assembly with a corrosion free encapsulating and flow conditioning tube 470. The encapsulating and flow conditioning tube 470 is preferably made of anticorrosion stainless steel with a thin wall. The encapsulating and flow conditioning tube may also be made of any material that is can resist corrosion and has structural strength to sustain high flow pressures. The openings around the assembly are then sealed with the silicone sealant such as RTV silicone sealant to form the completed sensor assembly 480 as shown in FIG. 16B.

Figure 17A:
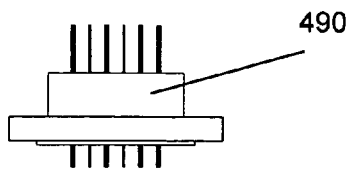
FIGS. 17A to 17B are side cross sectional views to show an attachment process by soldering the sensor assembly to a feed-through connector to form an insertion type flow meter.
Figures 17B, 17C:
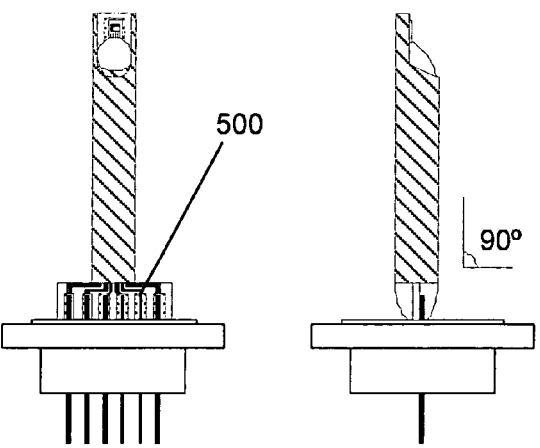

The sensor assembly 480 is then attached to a feed-through connector 490 shown in FIGS. 17A to 17C. The feed-through connector 490 is able to maintain a leak free seal under desired pressure. Attached with the sensor assembly 480, the feed-through connector 490 is then soldered to the feed-through connector pad 500. To maintain the sensitivity of the measurement, it is crucial that the final sensor assembly be attached perpendicular to the connector as exhibited in FIGS. 17B and 17C. After soldering, the silicone sealant such as RTV silicone sealant should be applied to the front and backside of the soldering area to sensor assembly encapsulation and flow conditioning tube to complete the assembling processes of a flow meter.

Figure 18:
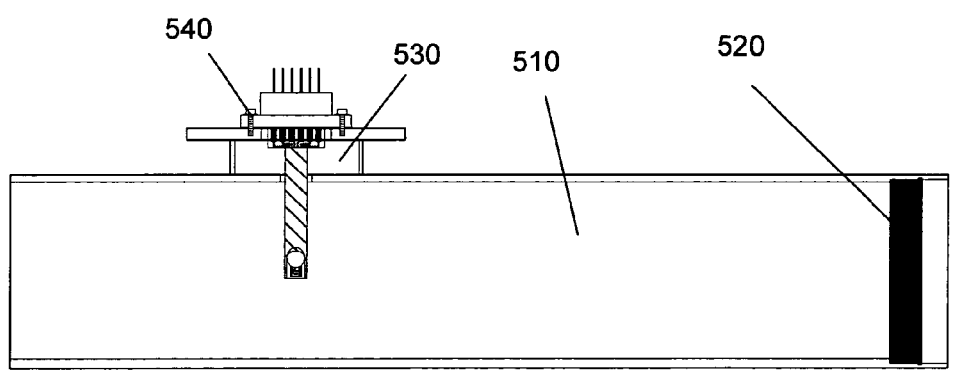
FIG. 18 is a side cross sectional view of inserting and bolting the flow meter to a flow pipe.
Figure 19:
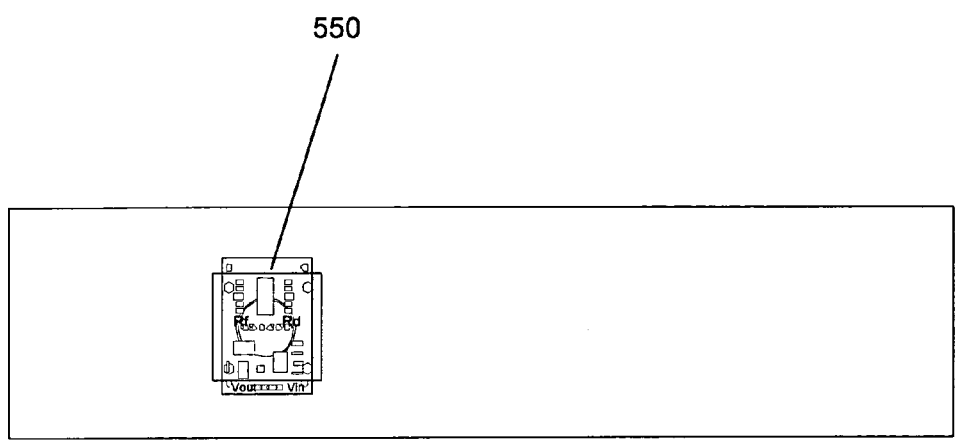
FIG. 19 is a side cross-sectional view for showing the installation and connection of a digital process unit and associated signal processes chips to the flow meter.

In FIG. 18, the flow meter is preferably made by insertion of the final sensor assembly into a house pipe that will be directly connected to the gas pipe where the measurement is conducted. After the sealant is dry out on connector with the final sensor assembly, the feed-through connector can then be installed into the house pipe 510. The house pipe is preferably made of stainless steel but can also made of other kinds of desired materials. A flow conditioner 520 should be installed in the upstream direction. The feed-through connector with the final sensor assembly connected to the house pipe via a connector 530 on the house pipe 510. The seal is secured by the four screws/bolts 540. The connection between the feed-through and the connector on the house pipe should be leak free and have sufficient attachment strength to stand against the maximum pressure asserted by the gas or liquid flow for flow rate measurements. As shown in FIG. 19, after the flow meter is installed, a flow rate processor 550 includes a signal processors and digital processing unit is then connected to the flow meter and attached to the house pipe for carrying out the signal processing and flow rate measurement functions.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:
1. An integrated mass flow rate sensor comprising:
a set of temperature sensors connected as part of a first circuit with a heating element disposed between said temperature sensors for measuring a temperature difference between an upstream and downstream temperature sensing elements for measuring a flow rate in a first range of flow rates; and
a resistive sensing element comprising an ambient temperature sensor in series connection with a resistor Rc having a constant resistance in combination with said heating element as part of a second circuit for measuring a heat loss of said heating element with reference to an ambient temperature for measuring a flow rate in a sec- ond range of flow rates wherein said first circuit and said second circuit simultaneously apply both said temperature difference between said upstream and downstream temperature sensing elements and said heat loss of said heat element respectively for concurrently measuring said flow rate that may fall within said first range of flow rates or said second range of flow rates whereby said integrated flow rate sensor having an expanded range of flow rate measurement covering said first range and said second range.

2. The integrated mass flow rate sensor of claim 1 wherein:
said first circuit and said second circuit comprising respectively a first Wheatstone bridge circuit and a second Wheatstone bridge circuit simultaneously receive and apply both said temperature difference between said upstream and downstream temperature sensing elements and said heat loss of said heat element respectively for concurrently measuring said flow rate over said expanded range.

3. The integrated mass flow rate sensor of claim 2 wherein:
a ratio of a detectable maximum to minimum flow rates measurable by applying said first and second Wheatstone bridge circuits is about 1000:1.

4. The integrated mass flow rate sensor of claim 2 wherein:
said first Wheatstone bridge circuit and said second Wheatstone bridge circuit are further connected to a multiple channel analog to digital converter (ADC) for converting multiple analog signals into multiple digital signals for processing by a digital processing unit.

5. The integrated mass flow rate sensor of claim 4 wherein:
said digital processing unit further includes a data storage device for storing a digital signal versus flow rate calibration table for determining a flow rate measurement by using a digital signal from either said first Wheatstone bridge circuit and a corresponding signal from said ADC or said second Wheatstone bridge circuit and another corresponding signal from said ADC.

6. The integrated mass flow rate sensor of claim 1 wherein:
said set of temperature sensors and said heating element are disposed on a thermally isolated membrane extending over a hollow space underneath formed as a bulk-etched cavity in a silicon substrate.

7. The integrated mass flow rate sensor of claim 6 wherein:
said thermally isolated membrane is disposed on a top surface of said substrate and said hollow space under said membrane as said bulk-etched cavity is a cavity opened from a bottom surface opposite said top surface.

8. The integrated mass flow rate sensor of claim 6 wherein:
said thermally isolated membrane is disposed on a top surface of said substrate and said hollow space under said membrane as said bulk-etched cavity is a cavity opened from a bottom surface opposite said top surface along a <100> crystal plane.

9. The integrated mass flow rate sensor of claim 6 wherein:
said thermally isolated membrane is disposed on a top surface of said substrate and said hollow space under said membrane as said bulk-etched cavity is a TMAH bulk etching cavity from a bottom surface opposite said top surface.

10. The integrated mass flow rate sensor of claim 6 wherein:
said thermally isolated. membrane is disposed on a top surface of said substrate and said hollow space under said membrane as said bulk-etched cavity is a KOH bulk etching cavity from a bottom surface opposite said top surface.

11. The integrated mass flow rate sensor of claim 6 wherein:
said thermally isolated membrane is disposed on a top surface of said substrate and said hollow space under said membrane as said bulk-etched cavity is a plasma bulk etching cavity from a bottom surface opposite said top surface.

12. The integrated mass flow rate sensor of claim 6 wherein:
said temperature sensors and said heating element further comprising a Pt/Cr resistor.

13. An integrated mass flow rate sensor comprising:
a set of temperature sensors with a heating element disposed between said temperature sensors connected as part of a first signal measuring circuit for measuring a temperature difference between said temperature sensors for measuring a flow rate in a first flow range; and
a resistive sensing element comprising an ambient temperature sensor in series connection with a resistor Rc having a constant resistance wherein said ambient temperature sensor and said resistor Rc connected in combination with said heating element as part of a second signal measuring circuit for measuring a mass flow rate by sensing a heat loss of said heating element wherein said first and second signal measuring circuits simultaneously measuring said temperature difference between said temperature sensors and said heat loss of said heating element respectively measure at least two different ranges of flow rate with a first range of flow velocity below a saturation flow velocity and a second range of flow velocity above said saturation flow velocity.

14. The integrated mass flow rate sensor of claim 13 wherein:
said integrated mass flow rate sensor simultaneously generating two analog signals representing respectively said temperature difference between said set of temperature sensors for measuring a flow rate in a first range of flow velocity below said saturation flow velocity and said heat loss of said heating element for measuring a flow rate in a second range of flow velocity above said saturation flow velocity.

15. The integrated mass flow rate sensor of claim 13 further comprising:
a two-channel analog to digital converter (ADC) for simultaneously converting said two analog signals to two digital signals representing digital signals for measuring said flow rate that may fall within said first or second ranges of flow rates.

16. The integrated mass flow rate sensor of claim 13 wherein:
said two temperature sensing signal measuring circuits comprising a first Wheatstone bridge circuit and a second Wheatstone bridge circuit.

17. The integrated mass flow rate sensor of claim 16 wherein:
a ratio of a detectable maximum to minimum flow rates measurable by applying said first and second Wheatstone bridge circuits is about 1.000:1.

18. The integrated mass flow rate sensor of claim 16 wherein:
said first Wheatstone bridge circuit and said second Wheatstone bridge circuit are further connected to a multiple channel analog to digital converter (ADC) for converting multiple analog signals into multiple digital signals for processing by a digital processing unit.

19. The integrated mass flow rate sensor of claim 18 wherein:
said digital processing unit further includes a data storage device for storing a digital signal versus flow rate calibration table for determining a flow rate measurement by using a digital signal from either said first Wheatstone bridge circuit and a corresponding signal from said ADC or said second Wheatstone bridge circuit and another corresponding signal from said ADC.

20. The integrated mass flow rate sensor of claim 13 wherein:
said set of temperature sensors and said heating element are disposed on a thermally isolated membrane extending over a hollow space underneath formed as a bulk-etched cavity in a silicon substrate.

21. The integrated mass flow rate sensor of claim 20 wherein:
said thermally isolated membrane is disposed on a top surface of said substrate and said hollow space under said membrane as said bulk-etched cavity is a cavity opened from a bottom surface opposite said top surface.

22. The integrated mass flow rate sensor of claim 20 wherein:
said thermally isolated membrane is disposed on a top surface of said substrate and said hollow space under said membrane as said bulk-etched cavity is a cavity opened from a bottom surface opposite said top surface along a <100> crystal plane.

23. The integrated mass flow rate sensor of claim 20 wherein:
said thermally isolated membrane is disposed on a top surface of said substrate and said hollow space under said membrane as said bulk-etched cavity is a TMAH bulk etching cavity from a bottom surface opposite said top surface.

24. The integrated mass flow rate sensor of claim 20 wherein:
said thermally isolated membrane is disposed on a top surface of said substrate and said hollow space under said membrane as said bulk-etched cavity is a KOH bulk etching cavity from a bottom surface opposite said top surface.

25. The integrated mass flow rate sensor of claim 20 wherein:
said thermally isolated membrane is disposed on a top surface of said substrate and said hollow space under said membrane as said bulk-etched cavity is plasma bulk etching cavity from a bottom surface opposite said top surface.

26. The integrated mass flow rate sensor of claim 13 wherein:
said temperature sensors and said heating element further comprising a Pt/Cr resistor.

27. The integrated mass flow rate sensor of claim 13 wherein:
said ambient temperature sensor is connected in series with a resistor having substantially a constant resistance disposed on a silicon substrate and further disposed on a thermally isolated membrane extending over a hollow space underneath as a bulk-etched cavity-supported on a carrier substrate.

28. The integrated mass flow rate sensor of claim 27 further comprising:
a heat sink disposed on said cater substrate attached to said temperature sensors and said heater and said ambient temperature sensor for dissipating heat generated therefrom.

29. The integrated mass flow rate sensor of claim 27 further comprising:
bonding wires for connecting said temperature sensors and said heating element and said ambient temperature sensor to said signal measuring circuits through said carrier substrate.

30. The integrated mass flow rate sensor of claim 29 further comprising:
a corrosion free encapsulating and flow conditioning tube having structural strength to sustain high flow pressures encapsulating said integrate mass flow rate sensor.

31. The integrated mass flow rate sensor of claim 29 further comprising:
a feed-through connector for connecting said integrated mass flow rate sensor disposed in a flow channel enclosed in a flow pipe to a flow-meter processor disposed outside of said flow pipe wherein said flow meter processor further receives signals from said signal measuring circuits.

32. A method for measuring a mass flow rate comprising:
measuring a flow rate in a first range of flow rates by connecting a set of temperature sensors as part of a first circuit and disposing a heating element between said set of temperature sensors for measuring a temperature difference between upstream and. downstream temperature sensing elements; and
measuring a flow rate in a second range of flow rates by connecting a resistive sensing element to function as an ambient temperature sensor connected in series with a resistor Rc having a constant resistance as part of a second circuit for measuring a heat loss of said heating element with reference to an ambient temperature wherein said first circuit and said second circuit simultaneously apply both said temperature difference between said upstream and downstream temperature sensing elements and said heat loss of said heat element respectively for concurrently measuring said flow rate that may fall within said first range of flow rates or said second range of flow rates.

33. The method of claim 32 further comprising:
receiving measurement signals of said first flow rate and said second flow rate as analog signals into a two-channel analog to digital converter (ADC) for simultaneously converting said two measurement signals to two digital signals representing digital signals for measuring said flow rate that may fall within said first or second ranges of flow rates.

34. The method of claim 32 wherein:
said step of connecting said set of temperature sensors and said pair of heating element as part of a first circuit and disposing a heating element between said set of temperature sensors further comprising a step of disposing said set of temperature sensors and said heating element on a thermally isolated membrane extending over a hollow space underneath as a bulk-etched cavity in a substrate.

* * * * *